(12) United States Patent
Don et al.

(10) Patent No.: US 10,907,639 B2
(45) Date of Patent: Feb. 2, 2021

(54) SUCTION PIPE INLET DEVICE FOR CENTRIFUGAL PUMP

(71) Applicant: FLSmidth A/S, Valby (DK)

(72) Inventors: Kenneth Lloyd Don, Oro Valley, AZ (US); Luis Fernando Echeverri, Tucson, AZ (US); John Semple Frater, Scottsdale, AZ (US)

(73) Assignee: FLSmidth A/S

( * ) Notice: Subject to any disclaimer, the term of this patent is extended or adjusted under 35 U.S.C. 154(b) by 0 days.

(21) Appl. No.: 16/469,834

(22) PCT Filed: Dec. 14, 2017

(86) PCT No.: PCT/IB2017/057963
§ 371 (c)(1),
(2) Date: Jun. 14, 2019

(87) PCT Pub. No.: WO2018/109722
PCT Pub. Date: Jun. 21, 2018

(65) Prior Publication Data
US 2019/0360495 A1    Nov. 28, 2019

(30) Foreign Application Priority Data

Dec. 16, 2016    (DK) .................................. 2016 71000

(51) Int. Cl.
*F04D 13/16* (2006.01)
*F15D 1/00* (2006.01)
(Continued)

(52) U.S. Cl.
CPC ............. *F04D 13/16* (2013.01); *F15D 1/001* (2013.01); *F16L 57/06* (2013.01);
(Continued)

(58) Field of Classification Search
CPC .. F04D 13/16; F04D 29/4273; F04D 29/4293; F04D 29/688; F15D 1/001;
(Continued)

(56) References Cited

U.S. PATENT DOCUMENTS 4,174,734 A    11/1979    Bradham, III
5,163,715 A *  11/1992    Rickard .............. F16L 13/0263
                                                    285/288.1
(Continued)

FOREIGN PATENT DOCUMENTS

DE    3338610 A    5/1984
DE    3338610 A1 * 5/1984    ............... G01F 1/44
(Continued)

OTHER PUBLICATIONS

The International Search Report and Written Opinion dated Mar. 15, 2018, 10 pages.

*Primary Examiner* — Atif H Chaudry
(74) *Attorney, Agent, or Firm* — Jeffrey A. Sharp (57) ABSTRACT

A suction pipe inlet device for a centrifugal pump, the device having a hollow tubular axisymmetric body along a longitudinal axis having an open first end adapted for fitting into or against a retention tank; an open second end adapted for fitting into or against an inflow end of a suction pipe having an outer pipe diameter and an inner pipe diameter; a converging section located closer to the retention tank; a diverging section located closer to the suction pipe; a throat located at the intersection point between the converging and diverging sections, the converging and diverging sections defining an interior converging-diverging geometry within the tubular axisymmetric body and the throat defining a minimum inner cross sectional area of the tubular axisymmetric body.

14 Claims, 5 Drawing Sheets

(51) Int. Cl.
*F16L 58/10* (2006.01)
*F16L 57/06* (2006.01)
*F04D 29/42* (2006.01)
*F04D 29/68* (2006.01)
*F04D 29/70* (2006.01)
*F15D 1/02* (2006.01)

(52) U.S. Cl.
CPC ...... *F16L 58/1036* (2013.01); *F04D 29/4273* (2013.01); *F04D 29/4293* (2013.01); *F04D 29/688* (2013.01); *F04D 29/708* (2013.01); *F15D 1/025* (2013.01); *Y10T 137/86348* (2015.04)

(58) Field of Classification Search
CPC . Y10T 137/86348; F16L 57/06; F16L 55/027; F16L 58/1036
See application file for complete search history.

(56) References Cited

U.S. PATENT DOCUMENTS

| | | | |
|---|---|---|---|
| 5,188,396 A * | 2/1993 | Calvin | F16L 57/06 285/16 |
| 2005/0229982 A1 | 10/2005 | Gonzales | |
| 2008/0187448 A1* | 8/2008 | Jones | F04D 29/708 417/342 |
| 2010/0252136 A1* | 10/2010 | Koch | F04D 29/708 138/109 |
| 2013/0049354 A1* | 2/2013 | Chase | F16L 21/04 285/93 |

FOREIGN PATENT DOCUMENTS

| | | | |
|---|---|---|---|
| FR | 2301764 A | 9/1976 | |
| FR | 2301764 A1 * | 9/1976 | ........... G21C 13/032 |
| WO | 2008/080437 A1 | 7/2008 | |

* cited by examiner

Example  Flow = 13 200 gpm (3 000 m³/h)
Fluid density = 1.0
Pipe inner diameter = 18 inch (0.457 m)

|  | With straight pipe entrance | With bell mouth entrance | With new suction pipe inlet device |
|---|---|---|---|
| Suction pipe losses computed | 3.33 ft (1.02 m) | 0.73 ft (0.22 m) | 1.25 ft (0.38 m) |
| Reduction in suction losses Vs. straight pipe entrance | 0 | -2.60 ft (-0.79 m) | -2.08 ft (-0.63 m) |
|  |  | -78% | -62% |

FIGURE 5

SUCTION PIPE INLET DEVICE FOR CENTRIFUGAL PUMP

FIELD OF THE INVENTION

The present invention relates to a suction pipe inlet device for minimizing entrance losses in slurry systems involving centrifugal pumps used in the mining and other processing industries to transport mixtures of liquids and solids such as slurries.

BACKGROUND OF THE INVENTION

Mixtures of liquids and solids, such as slurries in mining and mineral processing operations, are typically transported using centrifugal pumps. Examples of centrifugal pumps may be appreciated from U.S. Pat. Nos. 5,921,748, 7,074,017 and U.S. Patent Application Publication No. 2014/0037440.

Centrifugal pump performance can be negatively affected by a poor design of the channel that conducts the fluid, e.g. slurry, from the reservoir or sump to the suction nozzle of the pump, normally known as a suction pipe. Ideally the suction pipe should supply to the pump a steady flow of fluid with a uniform velocity profile while minimizing frictional losses in order to promote optimum pump performance, ensure throughput and system reliability, and maintain a reasonable energy consumption. Typical suction pipe designs used for handling slurry focus on safety and maintainability, usually incorporating simple pipe entrances at the sump, and as a consequence they tend to be inefficient due to e.g. friction losses at the suction inlet, high wear rates in the suction inlet due to non-uniform velocity and turbulence in the slurry, increasing the system head and therefore reducing production or increasing wear and energy consumption, this in addition to higher wear rates in the same suction pipe. For example, while typical "straight" pipe suction inlet designs with square corners protrude into the sump and can be pulled straight out of the sump wall; such a "straight" design causes unnecessarily high entrance losses that affect negatively the capacity and or performance of the pumping system. The "straight" design also causes the suction pipe inlet to wear out faster due to non-axial velocity components and turbulence in the slurry from what is known as the "vena contracta" effect. By way of further example, typical "bell mouth" pipe suction inlet designs (e.g. as shown in US 2005/0229982) commonly used in water pump installations are difficult to use in sumps intended for slurry since the "bell mouth" design implies diameter dimensions that exceed the size of the suction pipe and therefore cannot be pulled out easily through the wall of the sump, making it difficult to maintain or replace. Instead, when a "bell mouth" design requires maintenance or replacement, the retention tank is required to be drained so that the pipe inlet can be pulled out through the top of the retention tank involving undesirable and potentially unsafe operations.

OBJECT OF THE INVENTION

It is an object of the invention to overcome or at least alleviate one or more of the above problems and/or provide the consumer with a useful or commercial choice.

SUMMARY OF THE INVENTION

A suction pipe inlet device for a centrifugal pump is provided. The suction pipe inlet device may comprise a hollow tubular axisymmetric body along a longitudinal axis having an open first end adapted for fitting into or against a retention tank; an open second end adapted for fitting into or against an inflow end of a suction pipe having an outer pipe diameter and an inner pipe diameter; a converging section located closer to the retention tank; a diverging section located closer to the suction pipe; a throat located at the intersection point between the converging and diverging sections, the converging and diverging sections defining an interior converging-diverging geometry within the tubular axisymmetric body and the throat defining a minimum inner cross sectional area of the tubular axisymmetric body.

In an exemplary embodiment, the open first end may comprise an inner cross sectional area located at or near the edge of open first end, wherein an area ratio between the inner cross sectional area of the open first end and the minimum inner cross sectional area of the tubular axisymmetric body is between approximately 0.36 and 0.81. In some embodiments, the area ratio is between approximately 0.55 and 0.74.

In an exemplary embodiment, the converging section may be shaped as an arcuate smooth contraction, e.g. it can be elliptical shaped, such that the elliptical aspect ratio between an ellipse major radius and ellipse minor radius is between 1-6. In some embodiments, the aspect ratio (AR) may be between 2-4.

In an exemplary embodiment, the diverging section may be shaped such that an included angle of internal side walls increases from approximately 4 degrees in an area closer to the converging section to approximately 30 degrees in an area closer to the suction pipe. In some embodiments, the angle may increase from approximately 10 degrees in the area closer to the converging section to approximately 12 degrees in the area closer to the suction pipe.

In an exemplary embodiment, the suction pipe inlet device may be attached to the inflow end of a suction pipe by mechanical, adhesive or other forming means.

In an exemplary embodiment, the suction pipe inlet device may be a single integral piece with the suction pipe.

In an exemplary embodiment, the suction pipe inlet device may further comprise a plurality of spiral ribs or spiral grooves located on an interior portion of the converging section or diverging section for affecting fluid flow through the suction pipe inlet device.

In an exemplary embodiment, the suction pipe may further comprise a liner with a predetermined thickness and wherein the suction pipe also has an inner pipe lined wet diameter. In some embodiments, the inner cross sectional area of converging section may reduce progressively to a minimum inner cross sectional area corresponding to a reduction in radii approximately 0.05-0.20 times the inner pipe lined wet diameter. In some embodiment, the reduction in radii may be approximately 0.07-0.13.

In an exemplary embodiment, the outer pipe diameter of the suction pipe may be approximately equal to outer diameter of the hollow tubular axisymmetric body. Other details, objects, and advantages of the invention will become apparent as the following description of certain present exemplary embodiments thereof and certain present exemplary methods of practicing the same proceeds.

BRIEF DESCRIPTION OF THE FIGURES

Embodiments of the invention, by way of example only, will be described with reference to the accompanying drawings in which.

DETAILED DESCRIPTION OF THE INVENTION

Figure 1:
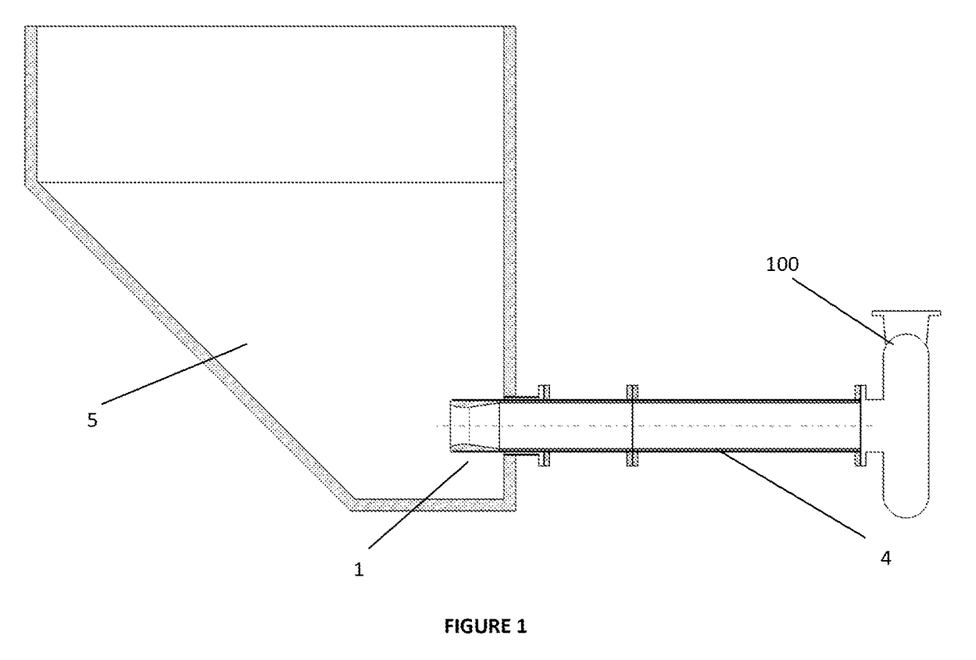
FIG. 1 shows an overview of an exemplary embodiment of the suction pipe inlet device, a retention tank or sump, a suction pipe and a centrifugal pump.

FIG. 1 shows an exemplary embodiment of the suction pipe inlet device 1, a suction pipe 4, a retention tank or sump 5 and a centrifugal pump 100. The suction pipe 4 connects the sump 5 with the suction nozzle of the centrifugal pump 100, and as shown the suction pipe inlet device 1 protrudes into or against the retention tank 5. The suction pipe inlet device 1 may be attached to or integral with the suction pipe 4, e.g. it may be attached by mechanical, adhesive or other forming means.

Figure 2:
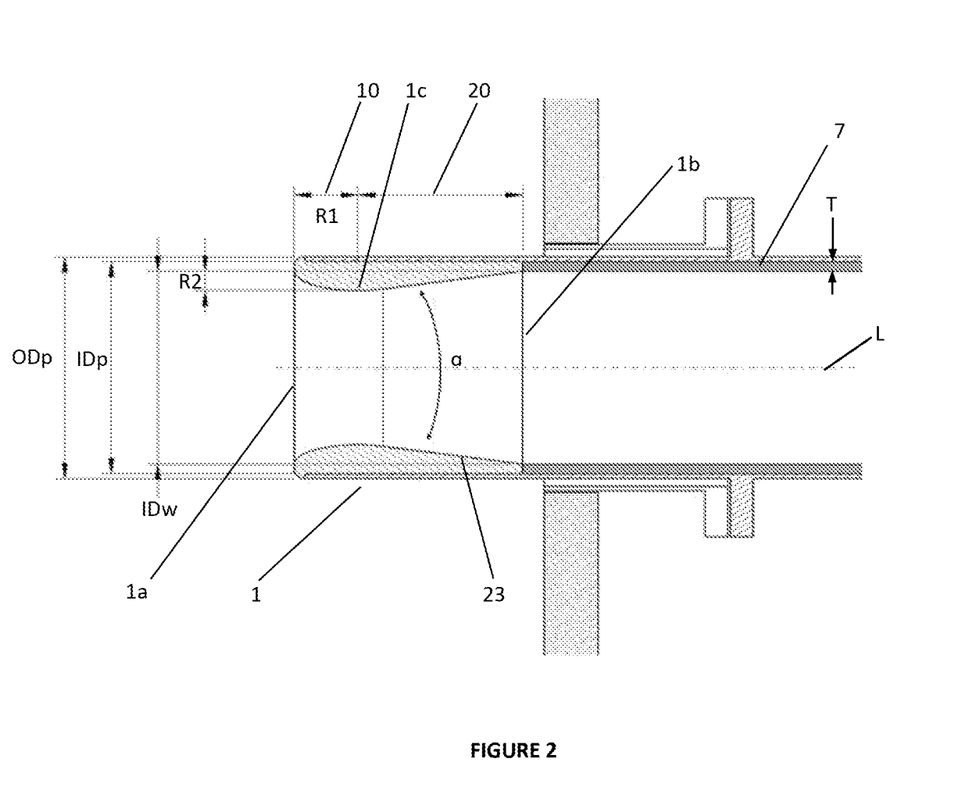
FIG. 2 shows a close-up view of an exemplary embodiment of the suction pipe inlet device.

Referring now to FIG. 2, the suction pipe inlet device 1 has a hollow tubular axisymmetric body along a longitudinal axis (L). Generally, the suction pipe inlet device 1 has an open first end 1a and an open second end 1b which is opposite the open first end 1a. The open first end 1a can protrude or project, at least partially, into the retention tank 5 or can be adapted such that the open first end 1a fits against an opening in the retention tank 5. The open second end 1b can protrude or project, at least partially, into an inflow end of a suction pipe 4 or can be adapted such that the open second end 1b fits against the inflow end of a suction pipe 4. The suction pipe 4 has an outer pipe diameter (ODp) and an inside pipe diameter (IDp). The open first end 1a also has an inner cross sectional area located at or near the edge or end of the open first end 1a. The suction pipe 4 may also have a thickness T, with or without a liner 7, resulting in a flow area which is defined herein as the pipe lined wet inner diameter IDw.

As further shown in FIG. 2, the suction pipe inlet device has an internal profile and an external profile. In an exemplary embodiment, the outer diameter or outer surface of the suction pipe inlet device 1 is approximately equal to the outer pipe diameter of the suction pipe 4. In an exemplary embodiment, the outer diameter or outer surface of the suction pipe inlet device 1 is shaped such that the suction pipe inlet device can be extracted through a generally circular hole or recess in the retention tank 5. In an exemplary embodiment the internal profile of the suction pipe inlet device 1 is designed such that there is an interior converging-diverging geometry within the tubular axisymmetric body and a throat 1c within the tubular axisymmetric body which defines a minimum inner cross sectional area of the tubular axisymmetric body. The throat 1c is located at the intersection point between a converging section 10 which is located closer to the retention tank 5 and a diverging section 20 which is located closer to the suction pipe 4.

In an exemplary embodiment of the converging section 10, the area ratio between the inner cross sectional area of the open first end 1a and the minimum inner cross sectional area at the throat 1c of the tubular axisymmetric body is between approximately 0.36 and 0.81, and preferably between approximately 0.55 and 0.74. In other words, the internal profile of the converging section 10 reduces progressively the cross sectional area from the open first end 1a to a minimum at the throat 1c corresponding to a reduction in radii approximately by 0.05 to 0.20 times the pipe lined wet inner diameter IDw and preferably by approximately 0.07-0.13.

In an exemplary embodiment of the converging section 10, the open first end 1a is shaped to define an arcuate smooth contraction, as for example an elliptical shape entrance, such that an elliptical aspect ratio AR between an ellipse major radius R1 and an ellipse minor radius R2 is between 1 and 6 and preferably between 2 and 4. As shown in FIG. 2, the ellipse major radius R1 is the length from the edge of the open first end 1a and the throat 1c and the ellipse minor radius R2 is the radial height or thickness of the converging section 10.

In an exemplary embodiment of the diverging section 20, the diverging section 20 is shaped such that an included angle $\alpha$ of internal side walls 23 increases from approximately 4 degrees in an area closer to the converging section 10 to approximately 30 degrees in an area closer to the suction pipe 4 and preferably from approximately 10 degrees in the area closer to the converging section 10 to approximately 12 degrees in the area closer to the suction pipe 4. In other words, the internal profile of the diverging section 20 is shaped to increase progressively its cross sectional area (from the throat 1c to the second open end 1b towards the side closer to the suction pipe 4) as for example linearly with an angle $\alpha$ between the internal side walls 23 that can be within 4 to 30 degrees and preferably within 10 to 12 degrees.

In some embodiments, the suction pipe inlet device 1 can be manufactured with a wear resistant material or the suction pipe inlet device 1 may be protected with a suitable wear resistant liner such as a hard metal or an elastomer. In some embodiments, it is envisaged that a plurality of spiral grooves or spiral ribs may be disposed on a slurry-side surface of the converging 10 or diverging 20 sections in order to produce a swirling motion in the slurry that helps to control problems associated with settling of solids along suction pipes when feeding centrifugal pumps 100.

Figure 3:
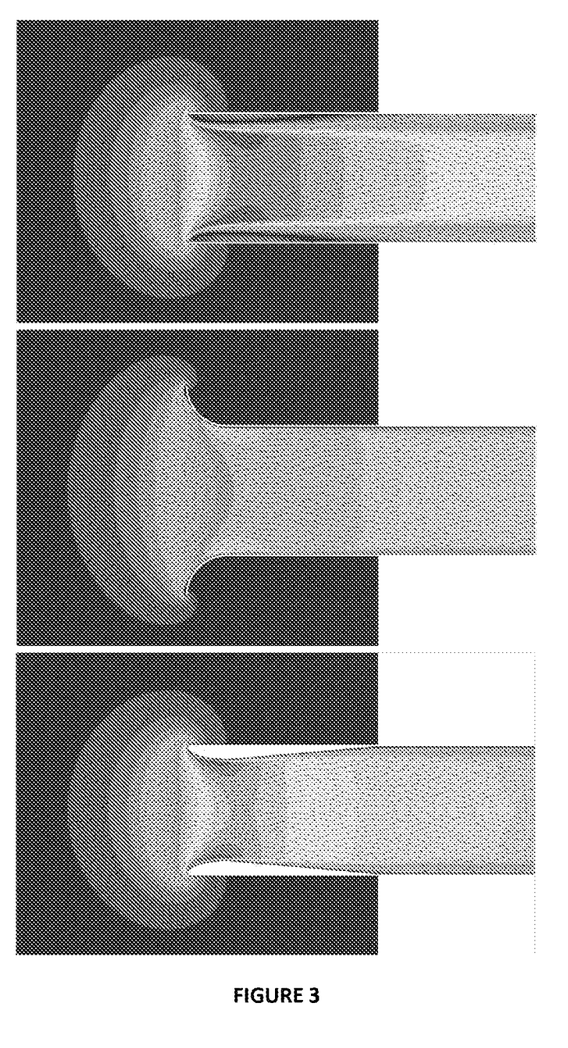
FIG. 3 shows a Computational Fluid Dynamics (CFD) result displaying velocity of the slurry within the suction pipe having the suction pipe inlet device of FIG. 2 compared to suction pipes having "straight" or "bell mouth" designs.
Figure 4:
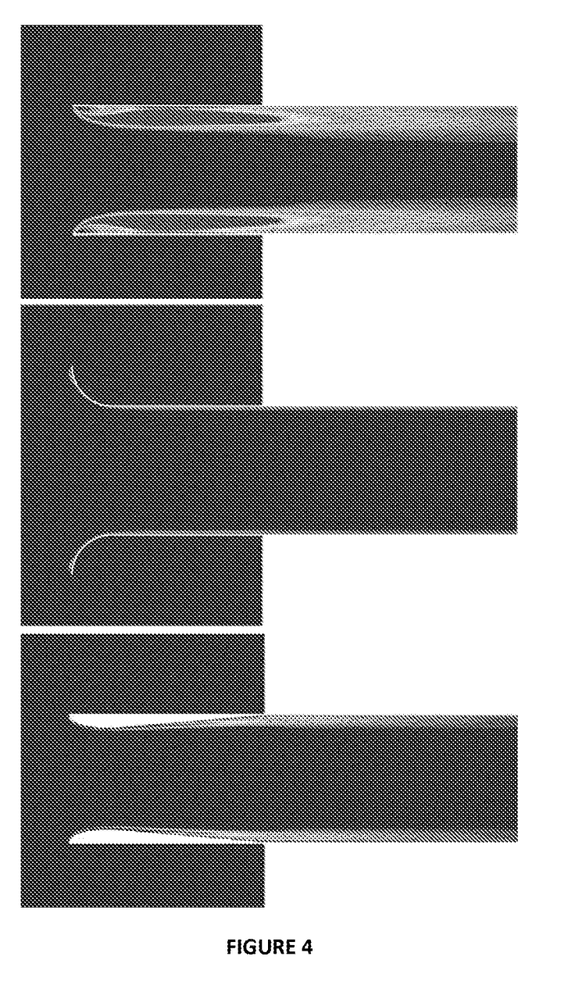
FIG. 4 shows a Computational Fluid Dynamics (CFD) result displaying turbulence of the flow within the suction pipe having the suction pipe inlet device of FIG. 2 compared to suction pipes having "straight" or "bell mouth" designs.

As shown in FIGS. 3 and 4, CFD analysis was conducted on the suction pipe inlet device 1 contemplated here, on a typical "straight" design and on a typical "bell mouth" design indicating enhanced velocity patterns and less turbulence with the suction pipe inlet device 1 compared with the traditional "straight" entrance design, offering a solution that would perform closer to the "bell mouth" design.

Figure 5:
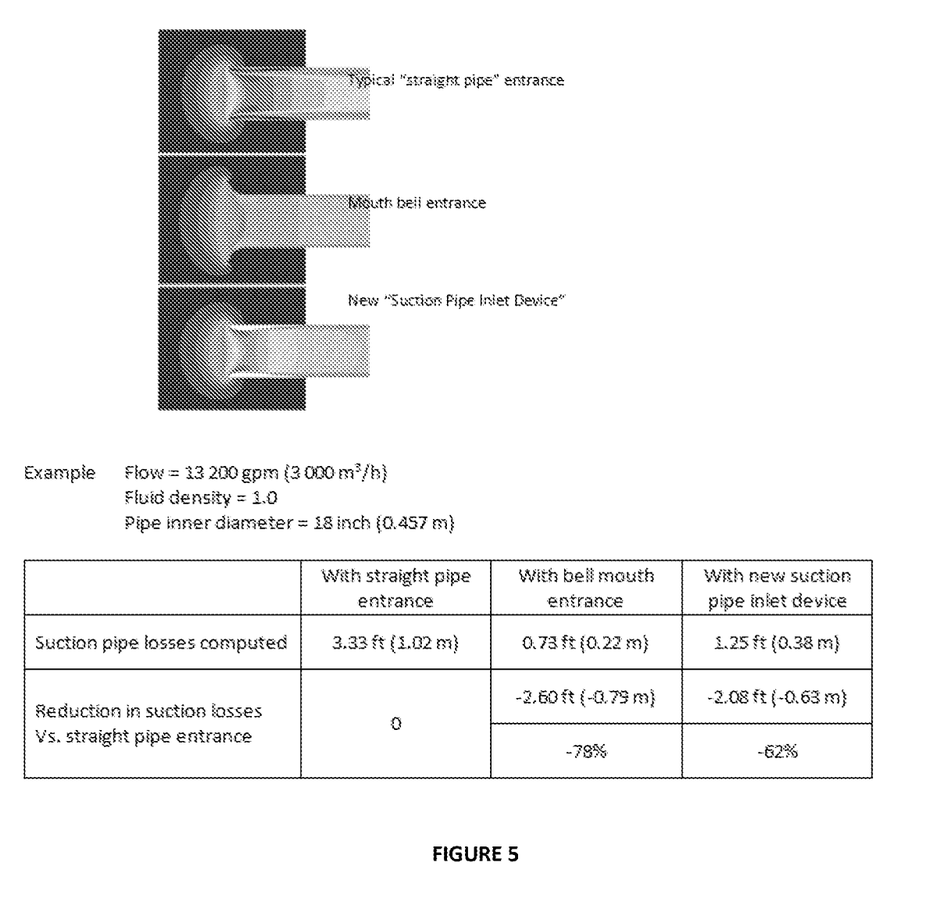
FIG. 5 shows computed entrance losses and calculated total dynamic head losses within the suction pipe having the suction pipe inlet device of FIG. 2 compared to suction pipes having "straight" or "bell mouth" designs using Computational Fluid Dynamics (CFD).

As shown in FIG. 5, using the CFD results (as shown in FIG. 3), inlet entrance losses were calculated for the suction pipe inlet device 1 contemplated here, for a typical "straight" design and for a typical "bell mouth" design at exemplary conditions: slurry flow=13,200 gpm (3,000 m3/h); Pipe inner diameter=18 inches (0.457 m). The results indicate a significant suction head loss of 3.33 ft (1.02 m) with the conventional straight pipe entrance design due mostly to entrance losses, which can be controlled as shown in this example with a bell mouth entrance predicted to reduce losses by 78% or with the suction pipe inlet device 1 disclosed here and predicted to reduce losses by 62%.

There are numerous advantages to the suction pipe inlet device (1) described and claimed herein. For example, it is estimated that the suction pipe inlet device (1) will (i) cut suction inlet loss by 50-60% from the "straight" pipe design equating to a few feet in overall total dynamic head requirements; (ii) increase slurry flow as compared to the "straight" design; (iii) be longer lasting than the "straight" pipe design due to less turbulence; (iv) be interchangeable with the typical "straight" designs, meaning an increase in pump performance without changing the design of the sump and (v) be easier to maintain and replace than the "bell mouth" design due to the same diameter as the hole in the retention tank while at the same time being closer in function to the "bell mouth" design.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

LIST OF COMPONENTS 1 suction pipe inlet device
1a open first end of suction pipe inlet device
1b open second end of suction pipe inlet device
1c throat
4 suction pipe
5 retention tank/sump
7 liner
10 converging section
20 diverging section
23 internal side walls of diverging section
100 centrifugal pump
L longitudinal axis
ODp outer pipe diameter
IDp inner pipe diameter
IDw inner pipe lined wet diameter
R1 ellipse major radius
R2 ellipse minor radius
AR elliptical aspect ratio
T predetermined liner thickness
α angle of internal side walls of diverging section

The invention claimed is:

1. A suction pipe inlet device (1) for minimizing entrance losses in slurry systems involving centrifugal pumps (100); the suction pipe inlet device (1) being removably connected to a retention tank (5) and removably connected to a suction pipe (4) that is connected to a centrifugal pump (100) downstream of the retention tank (5); a portion of the suction pipe inlet device (1) protruding into the retention tank (5); the suction pipe inlet device (1) comprising:
a hollow tubular axisymmetric body along a longitudinal axis (L) having an open first end (1a) in the retention tank (5); and an open second end (1b) downstream of the first end (1a);
a liner (7) extending from the open second end (1b) and having an inner pipe lined wet diameter (Idw) and a predetermined thickness (T):
an outer pipe diameter (Odp); and
an inner pipe diameter (Idp) receiving the hollow tubular axisymmetric body and the liner (7);
the hollow tubular axisymmetric body further comprising a converging section (10) located closer to the first open end (1a); a diverging section (20) located closer to the second open end (1b); a throat (1c) located at the intersection point between the converging and diverging sections (10, 20), the converging and diverging sections (10, 20) defining an interior converging-diverging geometry within the tubular axisymmetric body and the throat (1c) defining a minimum inner cross sectional area of the tubular axisymmetric body; and
wherein the outer pipe diameter (Odp) is selected and an outer surface of the suction pipe inlet device (1) is shaped such that the suction pipe inlet device (1) is configured to be extracted from the retention tank (5) and inserted into the retention tank (5) substantially free of interference, in a direction along longitudinal axis (L), through a hole in the retention tank (5) having a diameter that is greater than the outer pipe diameter (Odp).

2. The suction pipe inlet device (1) of claim 1, wherein the open first end (1a) comprises an inner cross sectional area located at or near the edge of open first end and wherein an area ratio between the inner cross sectional area of the open first end (1a) and the minimum inner cross sectional area of the tubular axisymmetric body is between approximately 0.36 and 0.81.

3. The suction pipe inlet device (1) of claim 2, wherein the area ratio is between approximately 0.55 and 0.74.

4. The suction pipe inlet device (1) of claim 1, wherein the converging section (10) is shaped as an arcuate contraction, and wherein an elliptical aspect ratio (AR) between an ellipse major radius (R1) and ellipse minor radius (R2) is in the raffle of 1-6.

5. The suction pipe inlet device (1) of claim 4, wherein the aspect ratio (AR) is in the range of 2-4.

6. The suction pipe inlet device (1) of claim 1, wherein the diverging section (20) is shaped such that an included angle (a) of internal side walls (23) is between 4 and 30 degrees.

7. The suction pipe inlet device (1) of claim 6, wherein the angle (α) is between 10 and 12.

8. The suction pipe inlet device (1) of claim 1, wherein the suction pipe inlet device (1) is attached to the inflow end of a suction pipe (4) by mechanical, adhesive or other forming means.

9. The suction pipe inlet device (1) of claim 1, wherein the suction pipe inlet device (1) is a single integral piece with the suction pipe (4).

10. The suction pipe inlet device (1) of claim 1, further comprising a plurality of spiral ribs or spiral grooves located on an interior portion of the converging section (10) or diverging section (20) for affecting fluid flow through the suction pipe inlet device (1).

11. The suction pipe inlet device (1) of claim 1, wherein the inner cross sectional area of converging section (10) reduces progressively to a minimum inner cross sectional area corresponding to a reduction in radii approximately 0.05-0.20 times the inner pipe lined wet diameter (Idw).

12. The suction pipe inlet device (1) of claim 11, wherein the reduction in radii is approximately 0.07-0.13.

13. A method of transporting slurry from a retention tank (5) to a centrifugal pump (100) downstream of the retention tank (5) via a suction pipe (4) connected to the centrifugal pump (100), the method comprising:
providing a suction pipe inlet device (1) for minimizing entrance losses in the slurry system; the suction pipe inlet device (1) comprising:
a hollow tubular axisymmetric body along a longitudinal axis (L) having an open first end (1a); and an open second end (1b) downstream of the first end (1a);

a liner (7) in contact with the open second end (1b) and having an inner pipe lined wet diameter (Idw) and a predetermined thickness (T);

an outer pipe diameter (Odp); and an inner pipe diameter (Idp) receiving the hollow tubular axisymmetric body and the liner (7);

the hollow tubular axisymmetric body further comprising a converging section (10) located closer to the first open end (1a); a diverging section (20) located closer to the second open end (1b); a throat (1c) located at the intersection point between the converging and diverging sections (10, 20), the converging and diverging sections (10, 20) defining an interior converging-diverging geometry within the tubular axisymmetric body and the throat (1c) defining a minimum inner cross sectional area of the tubular axisymmetric body; and, arranging the suction pipe inlet device (1) such that the open first end (1a) is in the retention tank (5), the suction pipe inlet device (1) is removably connected to the retention tank (5), the suction pipe inlet device (1) is removably connected to the suction pipe (4), and a portion of the suction pipe inlet device (1) protrudes into the retention tank (5);

wherein the outer pipe diameter (Odp) is selected and an outer surface of the suction pipe inlet device (1) is shaped such that the suction pipe inlet device (1) is configured to be extracted from the retention tank (5) and inserted into the retention tank (5) substantially free of interference, in a direction along longitudinal axis (L), through a hole in the retention tank (5) having a diameter that is greater than the outer pipe diameter (Odp).

14. The method of claim 13, further comprising the step of separating the suction pipe inlet device (1) from the retention tank (15) and from the suction pipe (4).

* * * * *